R. F. ROGERS.
WHEEL FENDER.
APPLICATION FILED JAN. 13, 1913.
1,143,071.  Patented June 15, 1915.
2 SHEETS—SHEET 1.
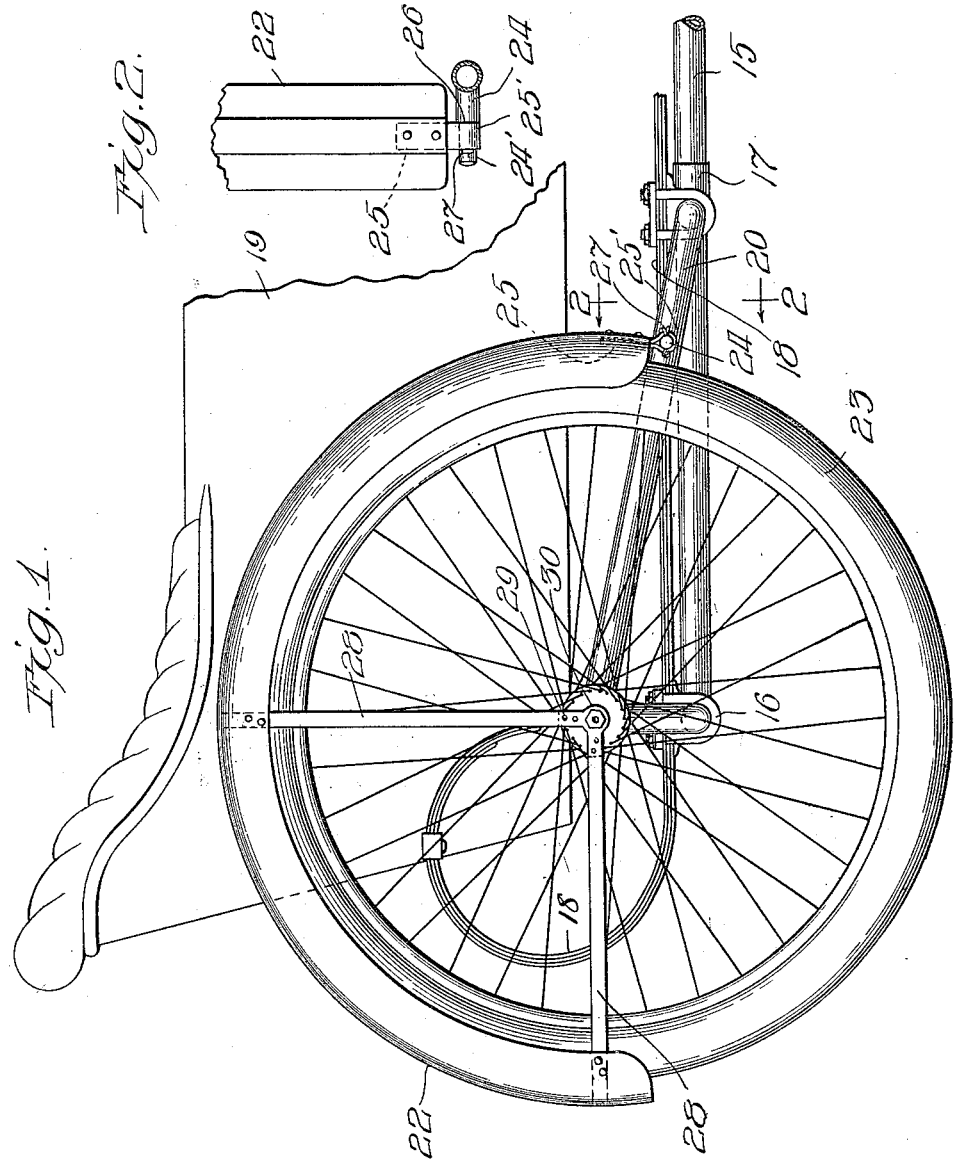
Witnesses:
Harry S. Gaither
S. M. Ryan
Inventor:
Ralph F. Rogers
by Offield, Towle, Graves & Offield,
Attys

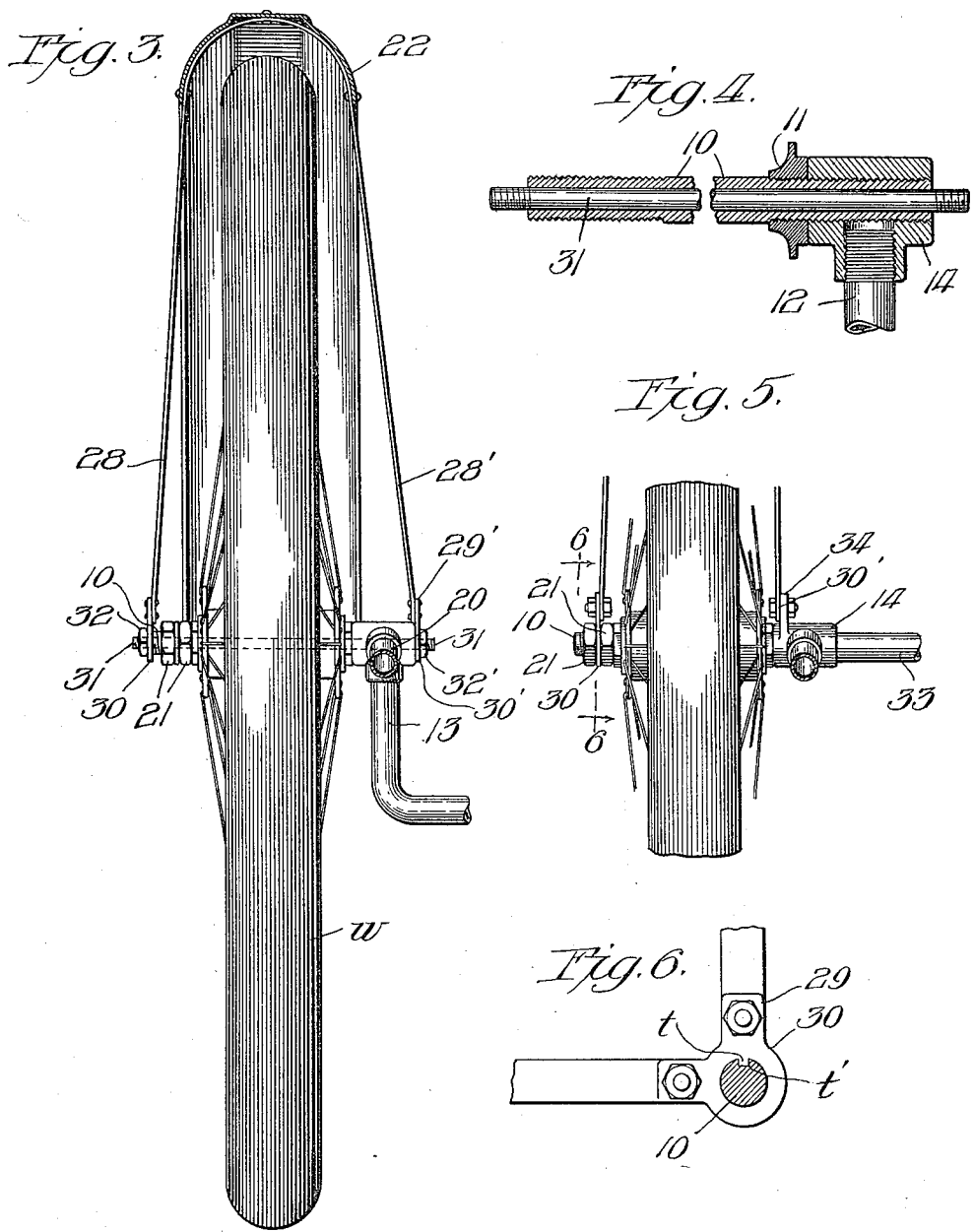

ated June 15, 1915.# UNITED STATES PATENT OFFICE.

RALPH F. ROGERS, OF CHICAGO, ILLINOIS.

WHEEL-FENDER.

1,143,071. Specification of Letters Patent. Patented June 15, 1915.

Application filed January 13, 1913. Serial No. 741,801.

*To all whom it may concern:*

Be it known that I, RALPH F. ROGERS, a citizen of the United States, and resident of Chicago, in the county of Cook and State of Illinois, have invented certain new and useful Improvements in Wheel-Fenders, of which the following is a specification.

My invention relates to improvements in wheel fenders, particularly such fenders as are used in connection with wheels having tires which must be removed at times in order to be repaired or replaced, as for example, wheels of bicycles, motor-cycles or other power driven vehicles. Fenders of this class are usually of semi-circular cross section and when applied about the wheel tires extend a considerable distance radially adjacent the tire sides, the tire and fender being in some cases concentric, such arrangement giving better protection to the tire and also making the fender more effective as a dirt or dust guard. Heretofore such fenders have been more or less rigidly secured in place about the tire thus making it very difficult to remove the tire from the wheel or to remove the wheel with the tire thereon, and the general object of the invention is to provide such construction and arrangement that with very little effort and manipulation the entire fender may be removed or swung a sufficient distance away from the wheel that the tire can be readily removed from the wheel or the entire wheel removed.

More in detail, the object is to support each fender at one end by hinge mechanism and to provide supporting means for the other end and intermediate parts of the fender which can be readily detached to allow the fender structure to be swung away to entirely clear the wheel.

The other objects of the invention are to provide modified structure and arrangement for adapting the hinged fender for use with different vehicle constructions and arrangements.

The various features of the invention are clearly illustrated on the accompanying drawings in which—

Figure 1 is a side elevational view of the rear end of the vehicle showing a hinged fender structure applied to the wheel; Fig. 2 is an enlarged view of the hinged end of the fender looking from plane 2—2, Fig. 1; Fig. 3 is a front view of the wheel and axle structure of Fig. 1 with the fender in vertical section; Fig. 4 is an enlarged sectional view showing the axle arrangement of Figs. 1 and 3; Fig. 5 shows the hub section of a wheel together with a modified form of axle structure, and Fig. 6 is an enlarged view on plane 6—6, Fig. 5, showing the manner of mounting a fender supporting attachment on the axle.

Referring to Figs. 1 to 4, a wheel $w$ is mounted about an axle 10 on suitable ball bearings of which one ball cone 11 is shown in Fig. 4. The wheel axle sections are supported from the ends of the main axle 12, which in these Figs. 1, 3 and 4 is of the drop axle class, the ends 13 of the main axle having each secured thereto a hub 14 into which the corresponding wheel axle section 10 is threaded as clearly shown in Fig. 4. As shown in Fig. 1, side bars 15 of the vehicle chassis extend forwardly from blocks 16 on the main axle and these blocks together with blocks 17 on the side beams 15 mount the springs 18 which support the vehicle body 19. At each side of the vehicle a brace 20 extends from the hub 14 to the block 17. The outer ball bearing cone of each wheel is threaded on to the outer end of the axle section 10 and is adjusted by nuts 21 on the axle section. Upon removal of the nuts 21 and the outer ball bearing the wheel can be removed from the axle section.

The structure and arrangement of the fenders is clearly shown in Figs. 1, 2 and 3. The fender 22 is substantially semi-circular in longitudinal extent and of substantially semi-circular cross section, and to give the most efficient results it should be applied intimately about the wheel to extend some distance along the sides of the wheel. In most cases, where a tire 23 is provided on the wheel, the fender is substantially concentric with the tread of the tire, as clearly indicated in Fig. 3. When the fender is in this position it is of course impossible to remove the wheel from its axle or to conveniently and readily strip the tire therefrom. My invention therefore contemplates the hinging of each fender at one end and the provision of supporting mechanism for the other end and intermediate parts which can be readily released to allow the entire fender structure to be swung to clear the wheel and tire thereon. As clearly shown in Figs. 1 and 2, a hinge stud 24 extends laterally from each brace 20 adjacent the periphery of the wheel, this stud having a reduced end 24' for receiving the loop 25' of a hinge strap 25 secured to the front end of the fender, the loop being confined on the end 24' by the shoulder 26 and by a cotter pin 27 or analogous means. The other end and intermediate parts of the fender are supported in proper position by radial struts or bars 28 at the outside and similar bars 28' at the inside, these bars being riveted or otherwise secured to the fender. The bars 28 are secured at their inner ends to radial ears 29 on the hub disk 30 and in a similar manner the struts 28' are secured to the radial ears 29' on the hub disk 30'. Extending through the wheel axle section 10 is a rod 31 for receiving at its ends the hub disks 30 and 30', nuts 32 and 32' engaging the threaded ends of the rod to clamp the hub disks securely against the ends of the axle sleeve 10. The wheel fender is thus rigidly secured and held in proper position with reference to the wheel. If at any time it is desired to remove the wheel or to remove the tire therefrom all that is necessary is to withdraw the nuts 32 and 32', then spring the struts 28, 28' outwardly to release the hub disks from the rod 31 and then to swing the entire fender structure forwardly. Instead of withdrawing both nuts 32, 32' only one of these can be removed and the rod 31 entirely withdrawn from the axle sleeve 10 to release the fender structure for swinging movement. After the wheel or the tire has again been replaced, the fender is swung back and the struts again clamped in place. Such hinging of the fender is also of great utility when the vehicle is to be cleaned as considerable dirt will accumulate on the inner side of the fender, but with the described arrangement the fenders can be readily swung to give free access to the interior thereof so that cleaning can be readily accomplished. If the fender becomes injured so that it can no longer be used, the rod 31 can be readily withdrawn and the pin 27 pulled out and the entire fender structure removed from the vehicle.

In Fig. 5, a modified arrangement for the fender is shown which is more particularly adaptable where a straight main axle 33 is used. In this case the main axle extends directly between and is secured in the ends of the hubs 14 so that the inner struts 28' of the fender cannot be secured as in the arrangement of Figs. 1 to 3. The up-standing lug 34 is therefore provided on each hub 14 to which the disk 30' is bolted or otherwise detachably secured. The hub disk 30 for the outer struts 28 engages with the wheel axle 10 and is secured between the ball bearing adjusting and locking nuts 21. In order to prevent turning of the structure 29, 30 when the struts 28 are disconnected therefrom, the disk 30 is preferably provided with a tongue $t$ for engaging in the groove $t'$ cut along the end of the axle 10. The ears 29 will then be held in proper radial position when the fender is again swung back into operative position so that the struts 28 can be accurately and quickly secured thereto. In either arrangement the fender structures may be swung away from the wheel or entirely removed from the vehicle without in any wise interfering with the running conditions of the wheel or without disturbing any of the wheel adjustments.

Changes and modifications could of course be made which would still come within the spirit of the invention and I do not therefore desire to be limited to the precise constructions and arrangements shown and described except as specified in the claim which is the following:

In combination with a supporting frame of a vehicle, an axle and a wheel journaled thereon, said axle being provided with a groove at one end thereof, a fender part way surrounding said wheel, supporting arms extending radially from said fender and adapted to be detachably secured to the projecting ends of said axle, a tongue carried by one of said supporting arms and adapted to enter said groove and a hinge connection between said fender and the vehicle supporting frame.

In witness whereof, I hereunto subscribe my name this 11th day of January, A. D. 1913.

RALPH F. ROGERS.

Witnesses:
   SADIE M. RYAN,
   JAMES R. OFFIELD.

Copies of this patent may be obtained for five cents each, by addressing the "Commissioner of Patents, Washington, D. C."